US005335539A

United States Patent [19]

Sweppy et al.

[11] Patent Number: 5,335,539

[45] Date of Patent: Aug. 9, 1994

[54] ONBOARD DETECTION OF OXYGEN SENSOR SWITCH RATE FOR DETERMINING AIR/FUEL RATIO CONTROL SYSTEM FAILURE

[75] Inventors: Michael S. Sweppy, Ypsilanti; James M. Kerns, Grosse Ile, both of Mich.

[73] Assignee: Ford Motor Company, Dearborn, Mich.

[21] Appl. No.: 95,810

[22] Filed: Jul. 22, 1993

Related U.S. Application Data

[63] Continuation of Ser. No. 752,744, Aug. 30, 1991, abandoned.

[51] Int. Cl.[5] .......... G01M 19/00

[52] U.S. Cl. .......... 73/118.1; 123/479; 60/277

[58] Field of Search .......... 73/118.1; 60/277; 123/688, 690, 434, 479

[56] References Cited

U.S. PATENT DOCUMENTS

| | | | |
|---|---|---|---|
| 4,252,098 | 2/1981 | Tomczak et al. | 123/688 |
| 4,383,409 | 5/1983 | Otsuka et al. | 123/688 |
| 4,445,326 | 5/1984 | Lyon | 73/117.3 |
| 4,844,038 | 8/1989 | Yomato et al. | 123/688 |
| 4,980,834 | 12/1990 | Ikeda et al. | 123/688 |
| 5,080,072 | 1/1992 | Hosokai et al. | 123/688 |

*Primary Examiner*—Hezron E. Williams
*Assistant Examiner*—Nashmiya Ashraf
*Attorney, Agent, or Firm*—Peter Abolins; Roger L. May

[57] ABSTRACT

Fault detection in a feedback air/fuel ratio control system using an exhaust gas oxygen sensor compares the expected transport delay time to the time between exhaust gas oxygen sensor output level switching. A fuel system failure is determined when there is an inappropriate switching rate of the oxygen sensor output level.

4 Claims, 1 Drawing Sheet

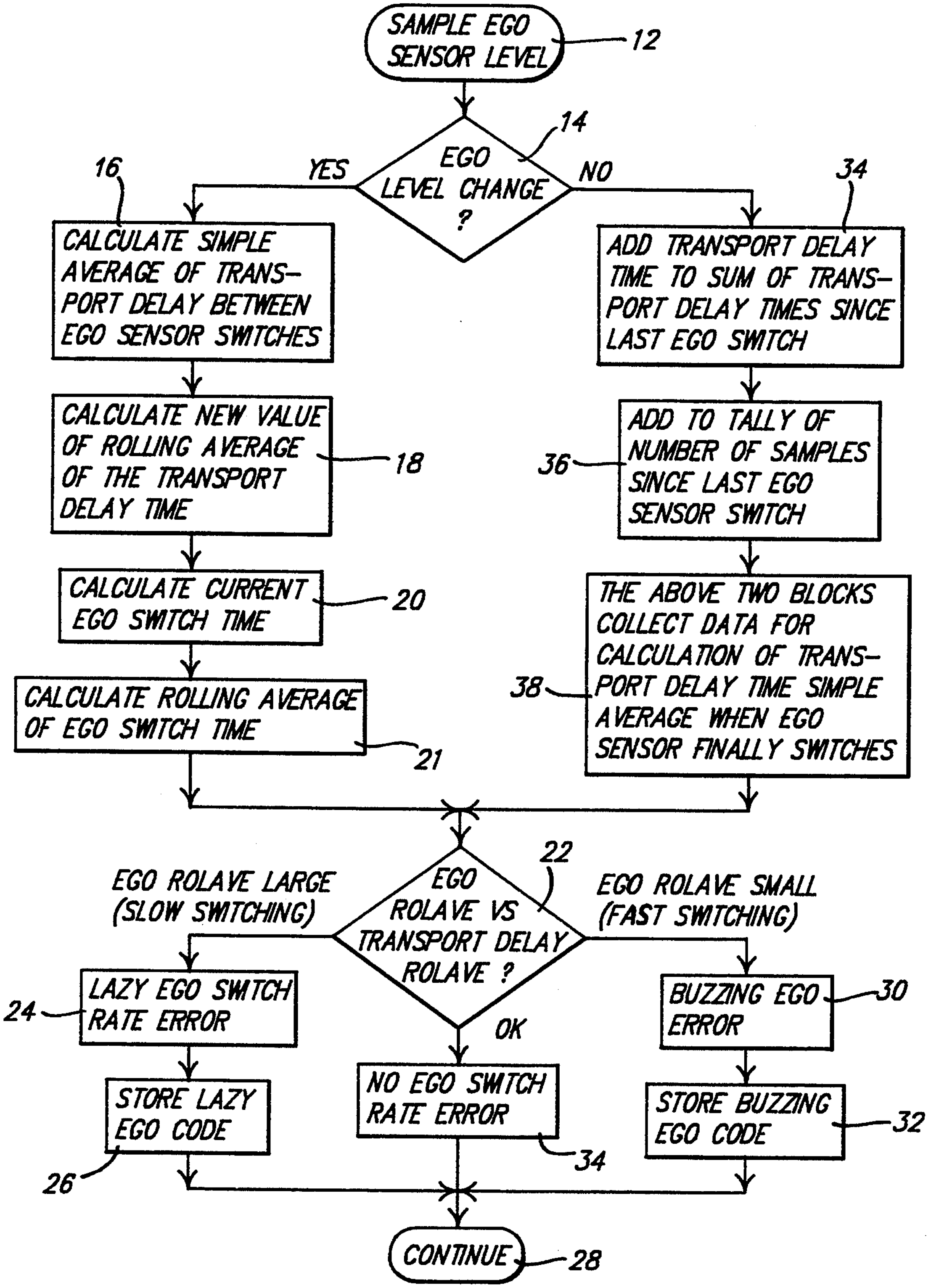
SAMPLE EGO SENSOR LEVEL
12
EGO LEVEL CHANGE ?
14
YES
NO
16
CALCULATE SIMPLE AVERAGE OF TRANS-PORT DELAY BETWEEN EGO SENSOR SWITCHES
CALCULATE NEW VALUE OF ROLLING AVERAGE OF THE TRANSPORT DELAY TIME
18
CALCULATE CURRENT EGO SWITCH TIME
20
CALCULATE ROLLING AVERAGE OF EGO SWITCH TIME
21
34
ADD TRANSPORT DELAY TIME TO SUM OF TRANS-PORT DELAY TIMES SINCE LAST EGO SWITCH
36
ADD TO TALLY OF NUMBER OF SAMPLES SINCE LAST EGO SENSOR SWITCH
38
THE ABOVE TWO BLOCKS COLLECT DATA FOR CALCULATION OF TRANS-PORT DELAY TIME SIMPLE AVERAGE WHEN EGO SENSOR FINALLY SWITCHES
EGO ROLAVE VS TRANSPORT DELAY ROLAVE ?
22
EGO ROLAVE LARGE (SLOW SWITCHING)
EGO ROLAVE SMALL (FAST SWITCHING)
OK
24
LAZY EGO SWITCH RATE ERROR
STORE LAZY EGO CODE
26
NO EGO SWITCH RATE ERROR
34
BUZZING EGO ERROR
30
STORE BUZZING EGO CODE
32
CONTINUE
28

ONBOARD DETECTION OF OXYGEN SENSOR SWITCH RATE FOR DETERMINING AIR/FUEL RATIO CONTROL SYSTEM FAILURE

This application is a continuation of application Ser. No. 07/752,744, filed Aug. 30, 1991 now abandoned.

BACKGROUND OF THE INVENTION

1. Field of the Invention

This invention relates to onboard diagnostics of vehicle operating parameters.

2. Prior Art

It is known to use oxygen sensors in the feedback control of air/fuel ratio of internal combustion engines. It is desirable to know when there has been a failure of an oxygen sensor or of the air/fuel ratio control system. It would be generally expected that throttle position transitions due to a vehicle operator actuation would result in exhaust gas oxygen sensor output level switching. Accordingly, it is known to monitor the number of throttle position transitions and compare it to a predetermined number of throttle position transitions. If the actual number of throttle position transitions is greater than the predetermined number, a transition in the output level of an exhaust gas oxygen sensor would be expected. If no such switching or output level transition of the oxygen sensor has occurred, it is assumed that there is some incorrect operation of the fuel control system, such as, for example, exhaust gas oxygen sensor failure.

However, this is only an approximate determination of a fault. For example, there may well be other failure modes which cannot be detected by such a simplistic method. These are some of the problems this invention overcomes.

SUMMARY OF THE INVENTION

This invention uses a comparison between the transport delay time and the time between exhaust gas oxygen sensor output level switching to determine if the exhaust gas oxygen sensor has an appropriate switching rate. Thus, if an exhaust gas oxygen sensor failure mode includes an incorrect switching rate then such a failure mode can be detected with this new method. Previous technology could only determine a fault when the oxygen sensor had stopped switching, and not when the switching rate was inappropriate.

BRIEF DESCRIPTION OF THE DRAWING

The figure is a logic flow diagram of a method of detecting an inappropriate oxygen sensor switching rate in accordance with an embodiment of this invention.

DETAILED DESCRIPTION OF THE INVENTION

Referring to the figure, a block diagram of an is exhaust gas oxygen sensor failure detection method starts by sampling an exhaust gas oxygen sensor output signal level at a block 12. Logic flow from block 12 goes to a decision block 14 wherein it is asked if the exhaust gas oxygen output level has changed. If the level has changed, logic flow goes to a block 16 wherein a simple average of the transport delay time between EGO sensor switches is determined.

Advantageously, the transport delay time for various engine operating speed/load conditions is stored in a table in an engine control system associated with control of the engine. These transport delay times are then selected in accordance with the speed and load operating conditions of the engine and used as inputs for calculating the new rolling average. Transport delay is the time between the injection of an air/fuel ratio charge into a cylinder and the time that the effect of that air/fuel ratio charge reaches the exhaust gas oxygen sensor downstream of the combustion cylinder.

Logic flow from block 16 goes to a block 18 wherein there is calculated a new value of the rolling average of the transport delay time. Logic flow from block 18 goes to a block 20 wherein there is calculated the current exhaust gas oxygen switching time. Logic flow from block 20 goes to a block 21 wherein there is calculated the rolling average of the exhaust gas oxygen sensor switching time. Logic flow then goes to a decision block 22 wherein the exhaust gas oxygen sensor rolling average switching time is compared to the transport delay rolling average. If the exhaust gas oxygen rolling average is large compared to the transport delay rolling average, indicating slow sensor switching, logic flow goes to a block 24 wherein a lazy exhaust gas oxygen sensor switching rate error is indicated. Logic flow then goes to a block 26 wherein the lazy exhaust gas oxygen sensor code is stored for future indication. Logic flow from block 26 goes to a block 28 indicating continuation of logic flow.

Returning to block 22, if the exhaust gas oxygen sensor switching rate rolling average is small with respect to the transport delay rolling average, indicating fast switching, logic flow goes to a block 30 wherein there is indicated a buzzing exhaust gas oxygen sensor error. Logic flow then goes to a block 32 wherein the buzzing exhaust gas oxygen code is stored. Logic flow then goes to block 28 to continue logic flow.

If at block 22 the exhaust gas oxygen rolling average comparison to the transport delay rolling average is within a predetermined range, operation is deemed to be OK and logic flow goes to a block 34 which indicates that no EGO switch rate error exists. The predetermined range is also used to determine predetermined switching times indicating a too large or a too small oxygen sensor switching time. Logic flow from block 34 goes to continuation block 28.

Returning to block 14, wherein the exhaust gas oxygen level is checked, if the answer is NO, indicating the oxygen sensor output level has not changed, logic flow goes to a block 33 wherein the transport delay time is added to the sum of the transport delay time since the last exhaust gas oxygen sensor switch. Logic flow then goes to a block 36 wherein it is added to the tally of number of samples since the lasts exhaust gas oxygen sensor switch. Logic flow then goes to a block 38, wherein the above two blocks 33 and 36 collect data for calculation of the transport delay time simple average when the exhaust gas oxygen sensor finally switches. Logic flow from block 38 goes to decision block 22. However, since there has been no change in the exhaust gas oxygen level change and there has been no new calculation of the exhaust gas oxygen sensor rolling average or the transport delay rolling average, there will be no change in the output of block 22 from the previous output.

Various modifications and variations will no doubt occur to those skilled in the art. For example, the particular way of calculating the average for the exhaust gas oxygen sensor switching or the transport delay may be varied from that disclosed herein. These and all other variations which basically rely on the teachings through which this disclosure has advanced the art are properly considered within the scope of this invention.

We claim:

1. A method of determining air/fuel ratio control system failure in an internal combustion engine having an exhaust gas oxygen sensor feedback control loop as part of an engine control system including the steps of:

determining an expected transport delay time of the engine;

generating a signal indicative of an average of a plurality of previously determined expected transport delay times of the engine;

detecting level switching of the exhaust gas oxygen sensor;

generating a signal indicating level switching of the exhaust gas oxygen sensor;

determining a time between the signal level switching of the exhaust gas oxygen sensor;

generating a signal indicative of an average of a plurality of times between level switching of the exhaust gas oxygen sensor;

comparing the signal indicating average transport delay time to the signal indicating average exhaust gas oxygen sensor level switching time; and determining an EGO sensor switching rate fault exists if the comparison indicates that one average is different from the other average by a predetermined amount.

2. A method as recited in claim 1 further comprising storing expected transport delay times for various engine speed and load conditions in a memory table associated with the engine control system.

3. A method as recited in claim 2 further comprising the steps of:

calculating a simple average of previously determined expected transport delay times.

calculating a rolling average of the previously determined expected transport delay times;

calculating an exhaust gas oxygen sensor level switching time rolling average;

comparing the exhaust gas oxygen sensor level switching time rolling average to the transport delay time rolling average;

determining a lazy exhaust gas oxygen sensor error if the exhaust gas oxygen sensor switching time rolling average is relatively large indicating slow switching; and determining a buzzing exhaust gas oxygen sensor error if the exhaust gas oxygen sensor switching time rolling average is small, indicating fast switching.

4. A method of determining air/fuel ratio control system failure in the internal combustion engine having an exhaust gas oxygen sensor feedback control loop as part of an engine control system including the steps of:

storing transport delay times for various engine speed and load conditions in a memory table associated with the engine control system;

determining an expected transport delay time based upon speed and load conditions of the engine;

detecting a level change in the exhaust gas sensor output as an EGO sensor switch as indicated by signal level switching;

calculating a simple average of previously determined expected transport delay times including maintaining, since the last EGO sensor switch, a transport delay time sum and the number of transport delay samples taken;

calculating a rolling average of previously determined expected transport delay times;

generating a signal indicative of the rolling average of a plurality of determined transport delay times of the engine;

generating a signal indicating signal level switching of the exhaust gas oxygen sensor;

calculating an exhaust gas oxygen sensor level switching time;

calculating an exhaust gas oxygen sensor level switching time rolling average;

generating a signal indicative of the rolling average of the times between signal level switching of the exhaust gas oxygen sensor;

comparing the signal indicating exhaust gas oxygen level switching time rolling average to the signal indicating the transport delay time rolling average;

determining a lazy exhaust gas oxygen sensor error exists if the exhaust gas oxygen sensor level switching time rolling average is larger than a first predetermined time average caused by slow switching;

determining a buzzing exhaust gas oxygen sensor error exists if the exhaust gas oxygen sensor level switching time rolling average is smaller than a second predetermined time average, indicating fast level switching; and determining there is no fuel system error if the exhaust gas oxygen sensor level switching time rolling average is between the first and second time averages.

* * * * *